United States Patent
Kuttumukkula Chandrasekaran et al.

(10) Patent No.: US 11,833,896 B2
(45) Date of Patent: Dec. 5, 2023

(54) RETENTION MECHANISMS FOR SERVICE ACCESS DOORS

(71) Applicant: Toyota Motor Engineering & Manufacturing North America, Inc., Plano, TX (US)

(72) Inventors: Sathya Shankar Kuttumukkula Chandrasekaran, Novi, MI (US); Robert J. Hazlewood, Plymouth, MI (US); Vikas Bhatia, South Lyon, MI (US); John J. Salvia, III, Ann Arbor, MI (US); Patrick J. Edgar, Ann Arbor, MI (US); Lynne Susan Dykins, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 195 days.

(21) Appl. No.: 17/231,203

(22) Filed: Apr. 15, 2021

(65) Prior Publication Data
US 2022/0332179 A1    Oct. 20, 2022

(51) Int. Cl.
*B60K 1/04*    (2019.01)
*H01M 50/20*    (2021.01)

(52) U.S. Cl.
CPC ............... *B60K 1/04* (2013.01); *H01M 50/20* (2021.01); *B60K 2001/0433* (2013.01)

(58) Field of Classification Search
CPC ................. H01M 50/20; B60K 2001/0433
See application file for complete search history.

(56) References Cited

U.S. PATENT DOCUMENTS

| | | | | |
|---|---|---|---|---|
| 6,360,908 B1 * | 3/2002 | Kline | ................. | B65D 51/18 |
| | | | | 220/276 |
| 8,579,346 B2 * | 11/2013 | Schaefer | ................. | E05B 79/06 |
| | | | | 296/1.08 |

(Continued)

FOREIGN PATENT DOCUMENTS

JP    6249726 B2    12/2017

OTHER PUBLICATIONS

"Manhole Cover Hook", found at: https://www.grainger.com/product/3TCR6?cm_mmc=PPC:+MSN+PLA&gucid=N:N:PS:Paid:MS:CSM-2295:WJ0R8G:20500731&s_kwcid=AL!2966!10!8973610473!1102900012916&ef_id=WIVMiAAAAMfo7x5u:20200922163451:s (accessed Mar. 23, 2021).

*Primary Examiner* — Jason D Shanske
*Assistant Examiner* — James J Triggs
(74) *Attorney, Agent, or Firm* — Christopher G. Darrow; Darrow Mustafa PC

(57) ABSTRACT

A retention mechanism for a removable access door includes a retention tab positioned along a side of the access door. The retention tab includes a resiliently deflectable stem and at least two engagement heads projecting from the stem. The tab extends to a first distance from a reference surface of the access door. An overstress prevention structure is positioned along the side of the access door so as to enable the retention tab to contact the overstress prevention structure when the stem is deflected a predetermined amount. The overstress prevention structure extends to a second distance from the reference surface, wherein the second distance is greater than the first distance. Support walls may strengthen the overstress prevention structure against forces exerted by the retention tabs during deflection of the tabs. The support walls may form a protective "shroud" around the retention tab.

12 Claims, 8 Drawing Sheets

(56) References Cited

U.S. PATENT DOCUMENTS

| | | |
|---|---|---|
| 8,740,137 B2 | 6/2014 | Vauchel et al. |
| 10,122,108 B2 | 11/2018 | Bhagyanathan Sathianathan et al. |

* cited by examiner

RETENTION MECHANISMS FOR SERVICE ACCESS DOORS

TECHNICAL FIELD

The present invention relates to retention mechanisms for removable access doors and, more particularly, to mechanisms for retaining an access door in a position covering a service opening in a panel designed to protect hybrid vehicle 12-volt battery components of a vehicle.

BACKGROUND

Hybrid vehicle 12-volt battery components may be stored in a cavity provided under a rear passenger seat 38 of a vehicle. A panel may be provided for covering the cavity and protecting the battery components. One or more service openings may be provided in the panel to enable access to the battery components for servicing. Removable access doors may be provided for covering and/or sealing the panel openings. An access door may include one or more projections or other retention features which are engageable with complementary features on the panel to retain the access door in a position covering the opening. The retention features may be disengaged to allow removal of the door from the panel. The retention features may be relatively fragile and susceptible to breakage of the access door is dropped on a floor surface. In addition, misalignment between the access door and the panel opening during mounting of the access door may cause damaging overstress of the retention features.

SUMMARY

In one aspect of the embodiments described herein, a retention mechanism for a removable access door is provided. The retention mechanism may include a retention tab positioned along a side of the access door. The retention tab may include a resiliently deflectable stem and at least two engagement heads projecting from the stem. The retention tab may extend to a first distance from a reference surface of the access door. An overstress prevention structure of the retention mechanism may be positioned along the side of the access door so as to enable the retention tab to contact the overstress prevention structure when the stem is deflected a predetermined amount. The overstress prevention structure may extend to a second distance from the reference surface, wherein the second distance is greater than the first distance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Also, unless otherwise stated or shown, the same or similar elements shown in different views may be given the same or similar reference numerals or designations.

DETAILED DESCRIPTION

Figure 1:
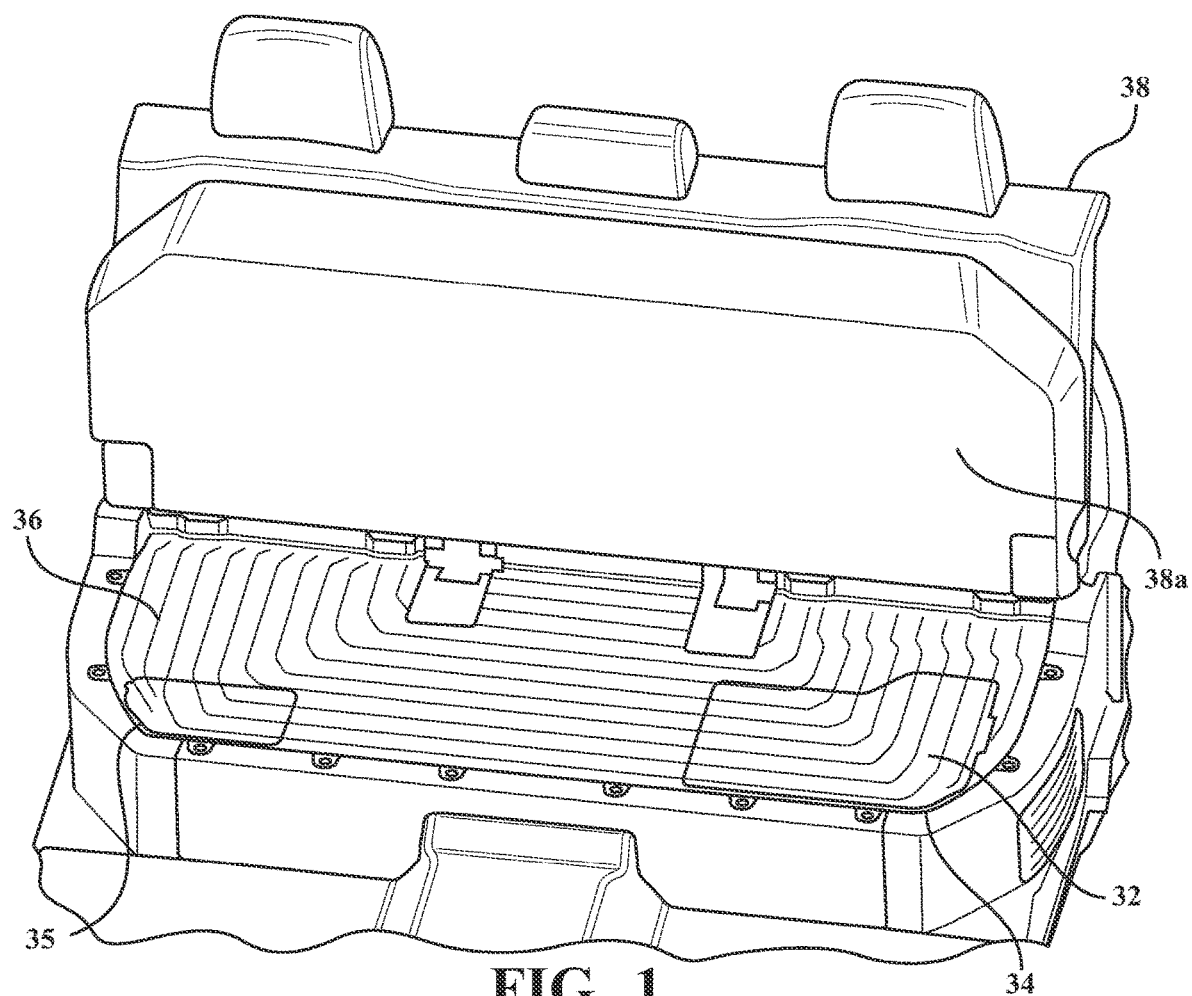
FIG. 1 is a perspective view of a vehicle rear seat including a panel having an access door which incorporates a retention mechanism in accordance with an embodiment described herein, for removably mounting and securing the access door to the panel.
Figure 2:
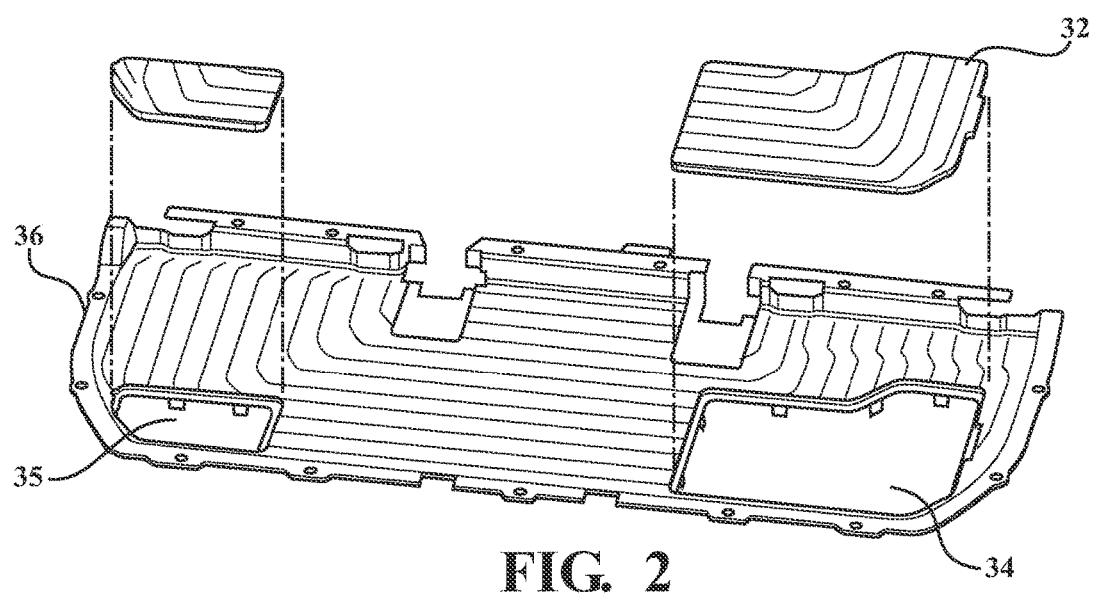
FIG. 2 is an exploded perspective view of the panel shown in FIG. 1, showing a pair of access doors which are mounted on the panel to cover service openings in the panel.
Figure 3:
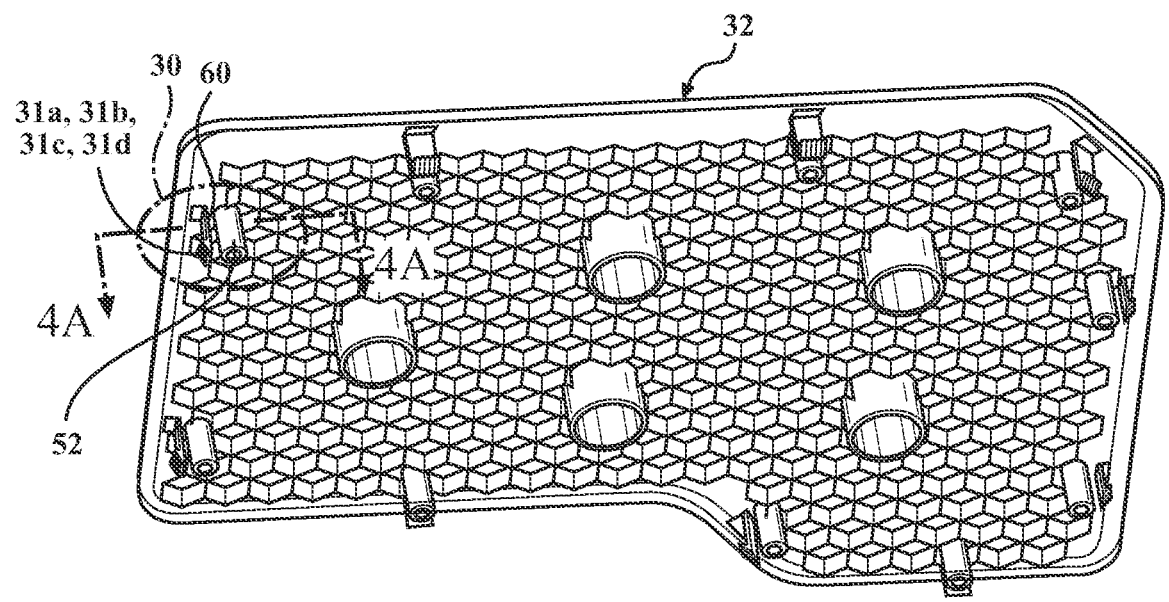
FIG. 3 is a perspective view of an underside of one of the access doors shown in FIG. 2, showing various positions of embodiment(s) of the access door retention mechanism along the access door.

Embodiments described herein relate to a retention mechanism for a removable access door used to cover and/or seal a service opening in a cover panel. The cover panel is used to cover and protect hybrid vehicle 12-volt battery components stored under a rear passenger seat of a vehicle. The opening 34 is used for servicing the battery components. The retention mechanism may include a retention tab positioned along a side of the access door. The retention tab may include a resiliently deflectable stem and at least two engagement heads projecting from the stem. The retention tab may extend to a first distance from a reference surface of the access door. An overstress prevention structure of the retention mechanism may be positioned along the side of the access door so as to enable the retention tab to contact the overstress prevention structure when the stem is deflected a predetermined amount. The overstress prevention structure may extend to a second distance from the reference surface, wherein the second distance is greater than the first distance. Making the overstress prevention structure longer than the retention tab may aid in preventing damage to the retention tab in case, for example, the access door is dropped onto a floor surface. Support walls incorporated into the overstress prevention structure may strengthen the overstress prevention structure against forces exerted by the retention tabs during deflection of the tabs. In certain arrangements, the support walls may form a protective "shroud" around the retention tab.

FIGS. 1-4C are schematic views showing an embodiment of a retention mechanism (generally designated 30) for an access door and an example of a typical application for the access door retention mechanism. The embodiment of the retention mechanism shown is incorporated into an access door 32 which covers and seals an access opening 34 formed in a flat panel 36 designed to protect hybrid vehicle 12-volt battery components stored under a rear passenger seat 38 of a vehicle (not shown). The opening 34 is used for servicing the battery components. The panel 36 may be positioned beneath a bottom 38a of the vehicle seat 38.

In one or more arrangements, the access door 32 may be molded from any suitable polymer and the elements of the access door retention mechanism 30 may be molded into the door. The panel 36 shown includes two access openings 34 and 35 allowing the battery system elements to be serviced. Each access opening may have an associated access door securable to the panel 36 using an embodiment of the retention mechanism described herein.

In the embodiments shown, retention mechanisms 30 are distributed along edges of the access door 32 for engaging surfaces positioned along the complementary opening 34 in the panel 36. As described herein, engagement between the retention mechanisms 30 and the panel surfaces along the associated opening 34 may secure the access door 32 in a position covering and sealing the opening 34. Any desired number and/or configuration of retention mechanisms may be distributed along the edges of the access door 32, according to the requirements of a particular application. Although several embodiments of the access door retention mechanism are described herein, employment of the retention mechanisms at different locations along the access door 32 may not be restricted to a single embodiment on a given door. Rather, any retention mechanism embodiment described herein may be used along with any other embodiment on a single door at different locations, depending on the requirements of a particular application.

Referring to FIGS. 1-4C, in one or more arrangements, each access door retention mechanism 30 may include a retention tab 60 positioned along a side 32a of the access door 32. The retention tab 60 may include a base 61, resiliently deflectable stem 40 extending from the base 61, and at least two engagement heads 31 projecting from the stem. The embodiments shown in the drawings include four engagement heads 31a, 31b, 31c, 31d. However, any embodiment of the retention mechanism may include more engagement heads or fewer engagement heads depending on such factors as a desired retention force of the retention mechanism, any space constraints imposed on positioning and/or size of the retention mechanism components by a particular access door application, and/or other pertinent factors.

The retention tab 60 may extend to a first distance L1 from a reference surface R1 of the access door 32. In one or more arrangements, the reference surface R1 may be a base surface along a body of the access door 32 and from which other features of the access door extend.

The stem 40 is designed to be resiliently deflectable at least within a range of motion from an undeflected condition (shown in phantom as condition "A" in FIG. 4A) in which no portions of the panel 36 are in contact with the engagement heads 31a, 31b, 31c, 31d, and a condition where the stem 40 is in contact with an overstress prevention structure (generally designated 50 in FIG. 4A and described in greater detail below). Overstress preventing contact between the retention tab 60 and the overstress prevention structure 50 during mounting of the door 32 is shown in phantom as condition "B" in FIG. 4A. The retention tab 60 may be deflected into contact with the overstress prevention structure 50 during sliding contact between the engagement heads 31a, 31b, 31c, 31d and the panel 36 during movement of the door 32 in direction S1 during mounting of the access door 32 (for example, due to the access door 32 not being centered over the opening during insertion or to tolerance stack-ups in the molded access door).

The retention tab 60 may be structured such that the retention tab stem 40 will deflect in response to a force applied to at least one of the engagement heads. The applied force may be a reaction force between the engagement heads 31a, 31b, 31c, 31d and a portion of the panel 36 during mounting of the access door 32 to the panel 36 as described herein. During insertion, the reaction force may tend to deflect the retention tab in a direction S2 toward the overstress prevention structure 50.

Figure 4A:
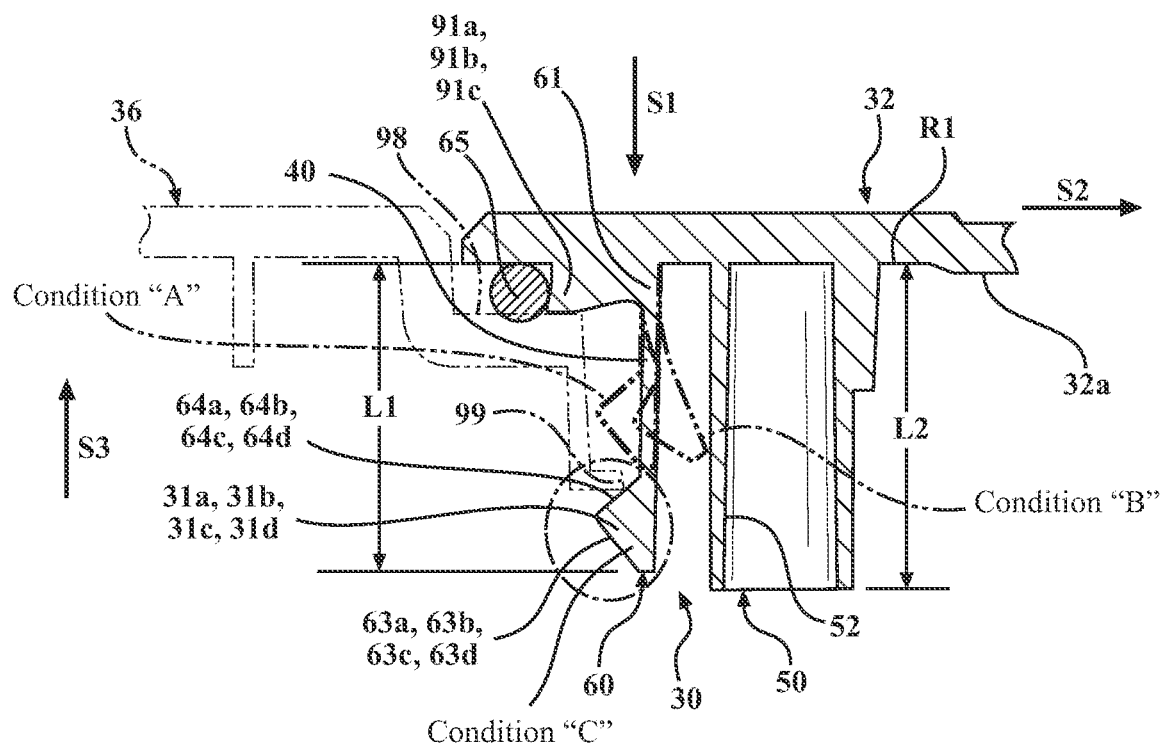
FIG. 4A is a cross sectional view of an access door retention mechanism in accordance with the embodiment shown in FIG. 3.
Figure 4B:
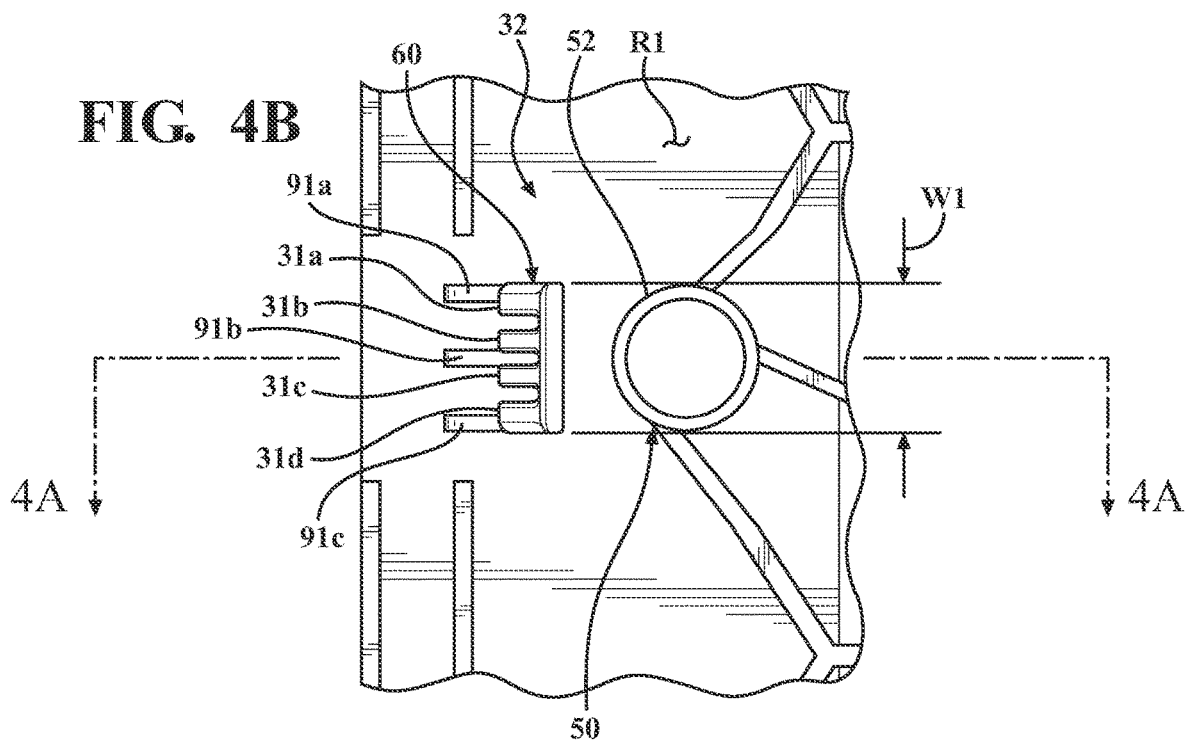
FIG. 4B is a view of the underside of the retention mechanism embodiment shown in FIGS. 3 and 4A.
Figure 4C:
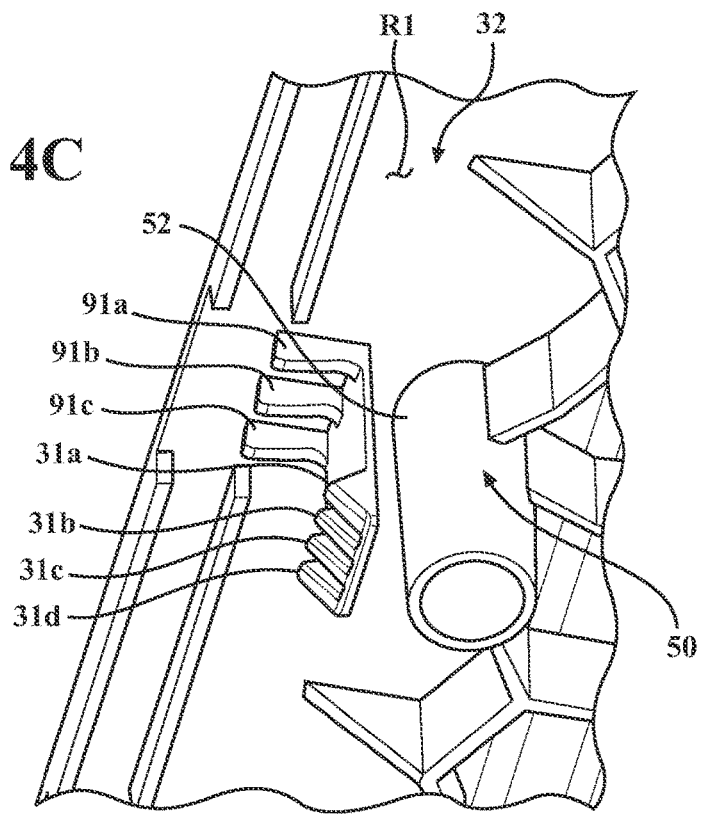
FIG. 4C is a perspective view of the underside of the retention mechanism embodiment shown in FIGS. 3-4B.

Referring to FIG. 4A, each of retention tab engagement heads 31a, 31b, 31c, 31d may include an associated lead-in surface 63 and a detent surface 64 (e.g., engagement head 31a may include a lead-in surface 63a and a detent surface 64a, engagement head 31b may include a lead-in surface 63b and a detent surface 64b, etc.). During mounting of the access door 32 to the panel 36, the lead-in surfaces 63 of the engagement heads 31a, 31b, 31c, 31d are structured to move in direction S1 and slidingly engage a surface 99 of the panel 36, causing resilient deflection of the retention tab 60 in direction S2 toward the overstress prevention structure 50. Continued collective movement of the engagement heads 31a, 31b, 31c, 31d in direction S1 moves the lead-in surfaces 63a, 63b, 63c, 63d past the panel surface 99, after which the panel surface 99 may be contacted by the tab detent surfaces 64a, 64b, 64c, 64d. Contact between the panel surface 99 and the detent surfaces 64a, 64b, 64c, 64d may continue after the access door 32 is fully mounted and the retention tab is in condition "C" (shown in FIG. 4A). This contact may produce and maintain a slight deflection of the retention tab 60 which, in turn, produces a reaction force component in a direction S3 opposite S1 which secures the access door 32 in place and may be used to compress a seal 65 (such as an O-ring) positioned between the access door 32 and the panel 36. Seal 65 may prevent water from entering the battery compartment through the panel opening 34.

It has been found that the provision of separate engagement heads facilitates changes in the width (and therefore, in the stiffness) of the retention tab 60. The retention tab width W1 (FIG. 4B) may be varied by discrete amounts according to the numbers and dimensions of the engagement heads 31 projecting from the stem 40 (e.g., by adding or removing an engagement head and associated length of a stem portion from which the engagement head projects).

Referring again to FIG. 4A, one or more seal positioning structures 91 may extend from the retention tab base 61 to help position the seal 65 with respect to the retention tab and to maintain the portion of the seal adjacent the retention tab in a position to sealingly contact a bearing surface 98 of the panel 36 when the access door 32 is mounted. In the embodiments shown, three positioning structures 91a, 91b, 91c are shown. However, any embodiment of the retention mechanism may include a greater or lesser number of positioning structures.

Referring to FIG. 4A, the overstress prevention structure 50 may be provided to prevent overstress and breakage of the retention tab 60 during mounting of the access door 32 to the panel 36. The overstress prevention structure 50 may be located along the side 32a of the access door 32 so as to enable the retention tab 60 to contact the overstress prevention structure 50 when the stem 40 is deflected a predetermined amount. The overstress prevention structure 50 may extend to a second distance L2 from the reference surface R1, where the second distance L2 is greater than the first distance L1 to which the retention tab 60 extends. As illustrated by condition "B" of FIG. 4A, the retention tab 60 may contact the overstress prevention structure 50 prior to becoming stressed to the point of plastic deformation or breakage.

In embodiments described herein, the overstress prevention structure 50 may include a contact wall (generally designated 52) positioned and oriented so as to enable the retention tab 60 to contact the wall when the stem 40 is deflected the predetermined amount. In one or more arrangements, the contact wall may be curved. In particular arrangements, the curved contact wall may be a cylindrical wall such as wall 52 shown in FIGS. 1-4C. In embodiments where the contact wall is cylindrical, the cylindrical structure may also serve as a feature facilitating ejection of the access door mold from a mold.

Figure 5A:
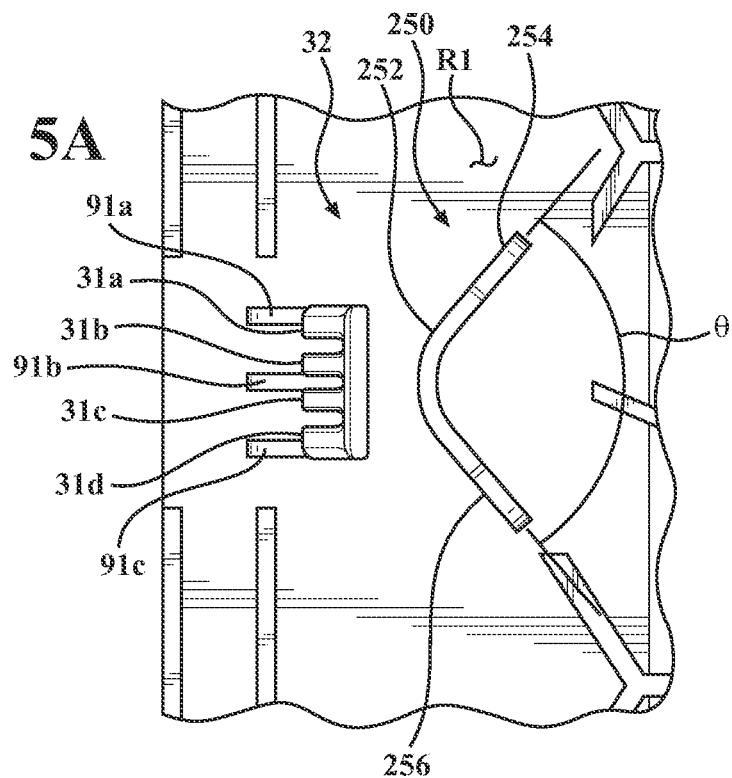
FIG. 5A is a view of the underside of a retention mechanism in accordance with another embodiment described herein.
Figure 5B:
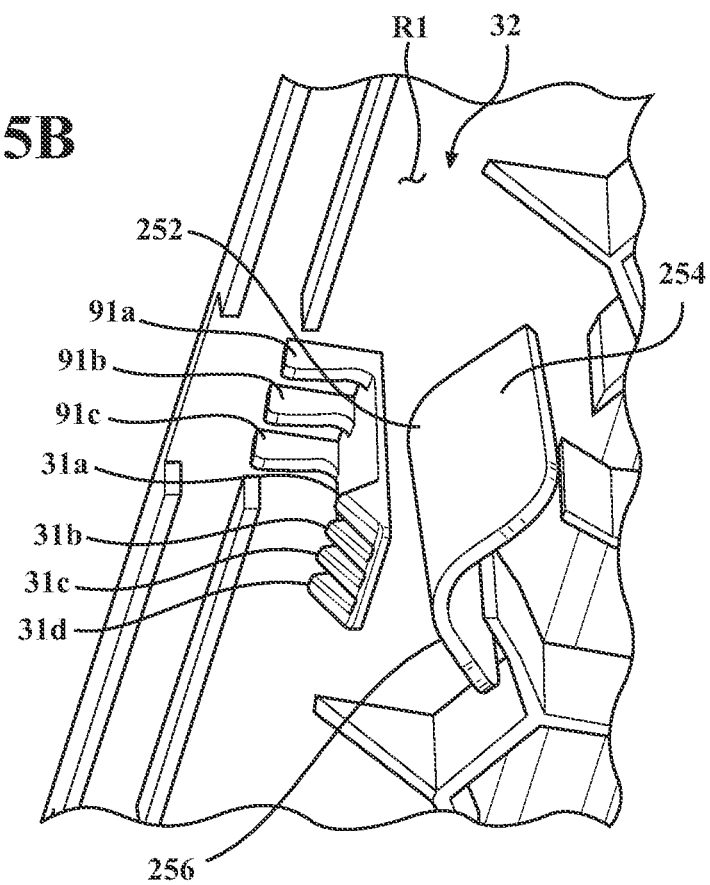
FIG. 5B is a perspective view of the underside of the retention mechanism embodiment shown in FIG. 5A.

FIGS. 5A and 5B show another embodiment 250 of the overstress prevention structure having a curved contact wall 252. In addition, an embodiment of the overstress prevention structure may include at least one support wall extending between the contact wall and another portion of the access door 32. The support wall(s) may help support the contact wall against forces exerted by the deflecting stem 40. In one or more arrangements, one or more of the support wall(s) may extend between the contact wall and the access door reference surface R1.

In one example, as shown in FIGS. 5A and 5B, depending on the positioning of other features to be incorporated into the access door, the overstress prevention structure 250 may include a first support wall 254 extending from the curved contact wall 252, and a second support wall 256 extending from the contact wall 252 and opposite the first support wall 254 so as to form an obtuse included angle θ between the first support wall 254 and the second support wall 256. Each of the support walls 254, 256 may extend from the contact wall 252 to reference surface R1 or to one or more other surfaces of the access door 32.

Figure 6A:
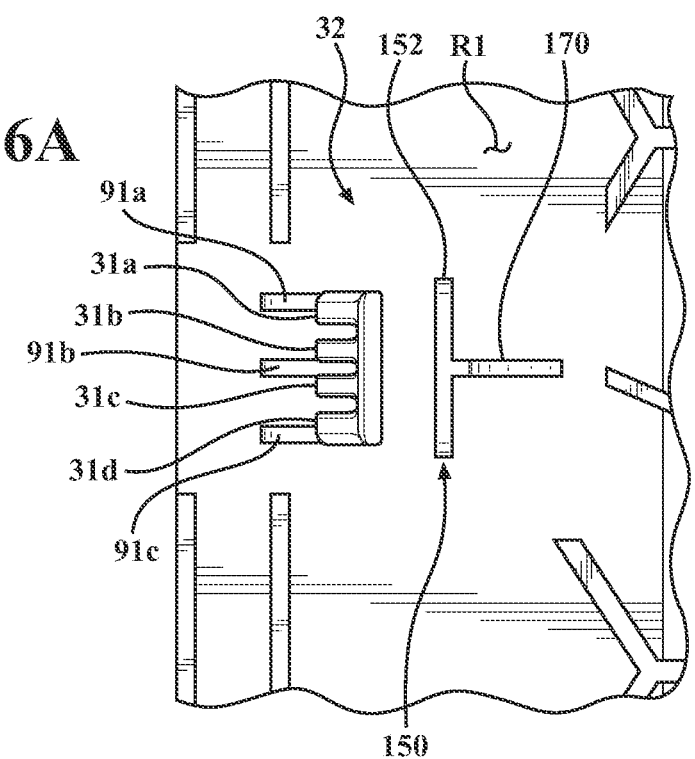
FIG. 6A is a view of the underside of a retention mechanism in accordance with another embodiment described herein.
Figure 6B:
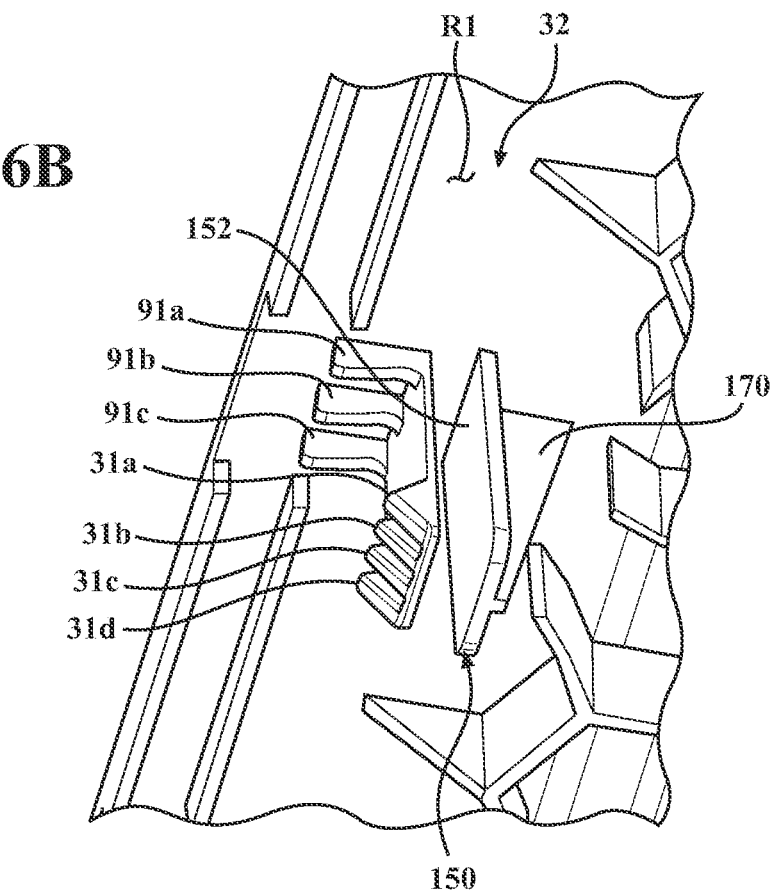
FIG. 6B is a perspective view of the underside of the retention mechanism embodiment shown in FIG. 6A.

In other arrangements, the contact wall may be a flat wall positioned and oriented so as to enable the retention tab to contact the contact wall when the stem 40 is deflected the predetermined amount. For example, in an alternative embodiment 150 of the overstress prevention structure shown in FIGS. 6A and 6B, a single support wall 170 extends between a flat contact wall 152 and the reference surface R1.

In one or more arrangements, to help provide maximum direct resistance against any forces that may be exerted by the stem 40 on the contact wall during mounting of the access door, one or more of the support wall(s) may be structured to form a 90° included angle with the contact wall. For example, the embodiment 150 of the overstress prevention structure shown in FIGS. 6A and 6B includes a single support wall 170 which forms a pair of 90° angles with the flat contact wall 152.

Figure 7A:
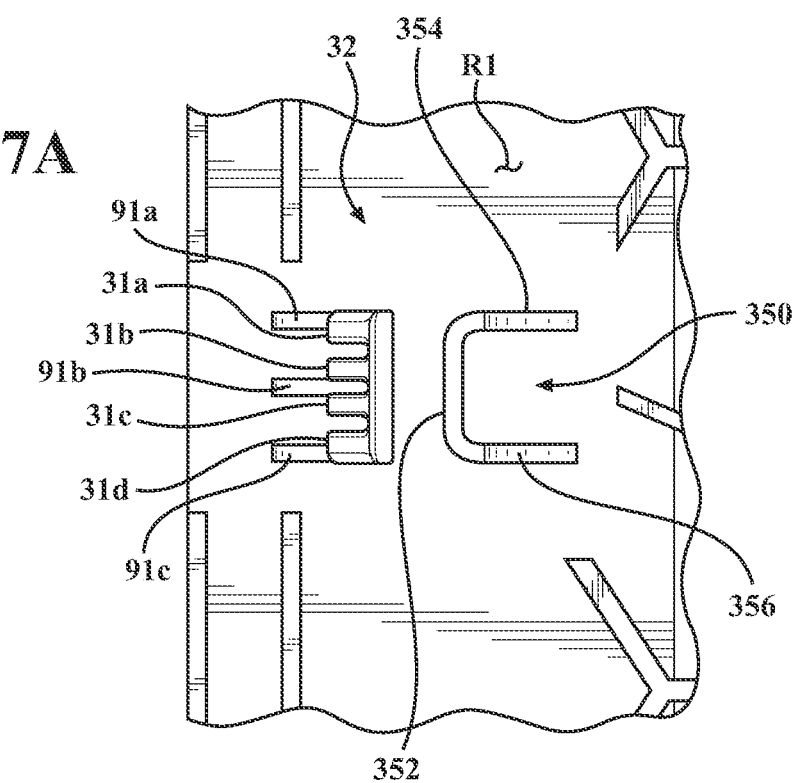
FIG. 7A is a view of the underside of a retention mechanism in accordance with another embodiment described herein.
Figure 7B:
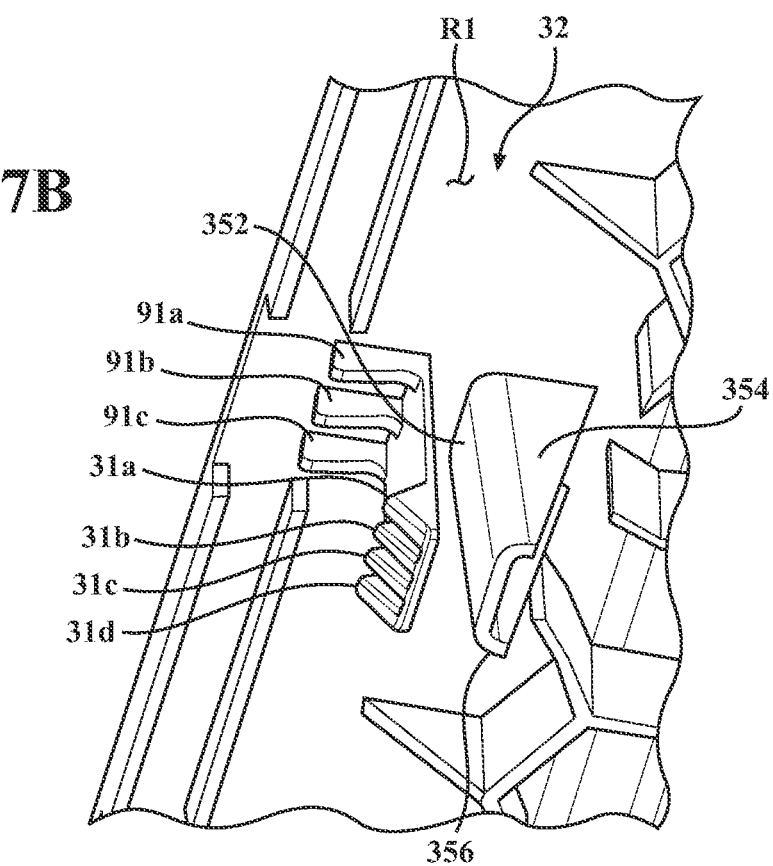
FIG. 7B is a perspective view of the underside of the retention mechanism embodiment shown in FIG. 7A.

Referring to FIGS. 7A and 7B, in another embodiment 350 of the overstress prevention structure, the overstress prevention structure may include a first support wall 354 extending from a flat contact wall 352, and a second support wall 356 extending from the contact wall 352 and opposite the first support wall 354. In addition, each support wall may form a 90° angle with the contact wall 352.

Figure 8A:
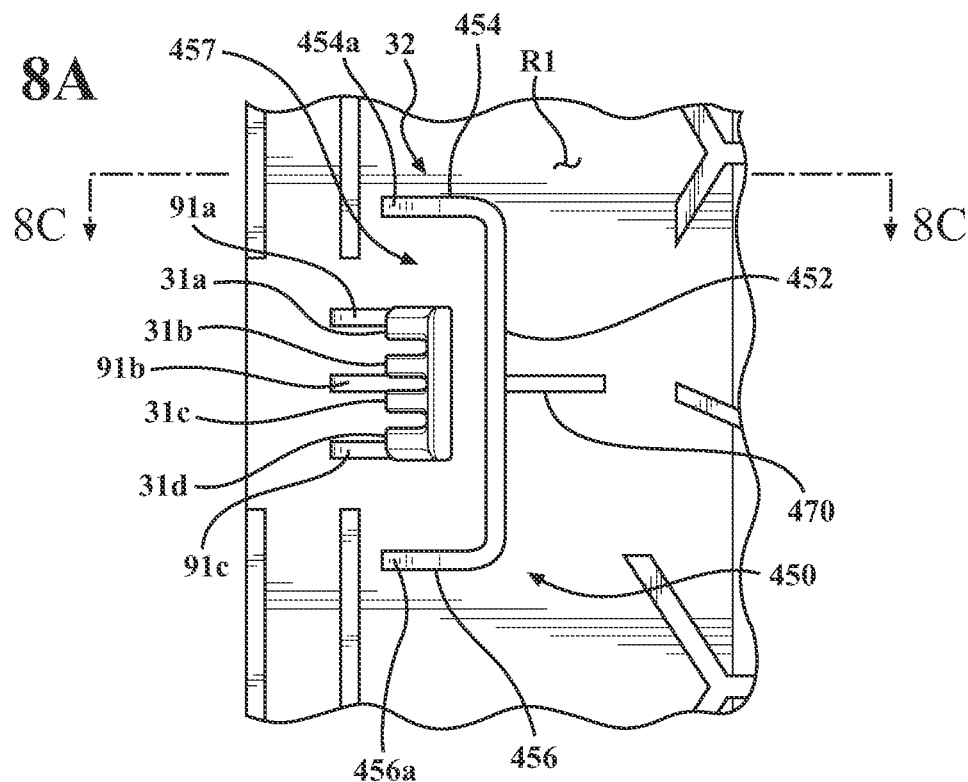
FIG. 8A is a view of the underside of a retention mechanism in accordance with another embodiment described herein.
Figure 8B:
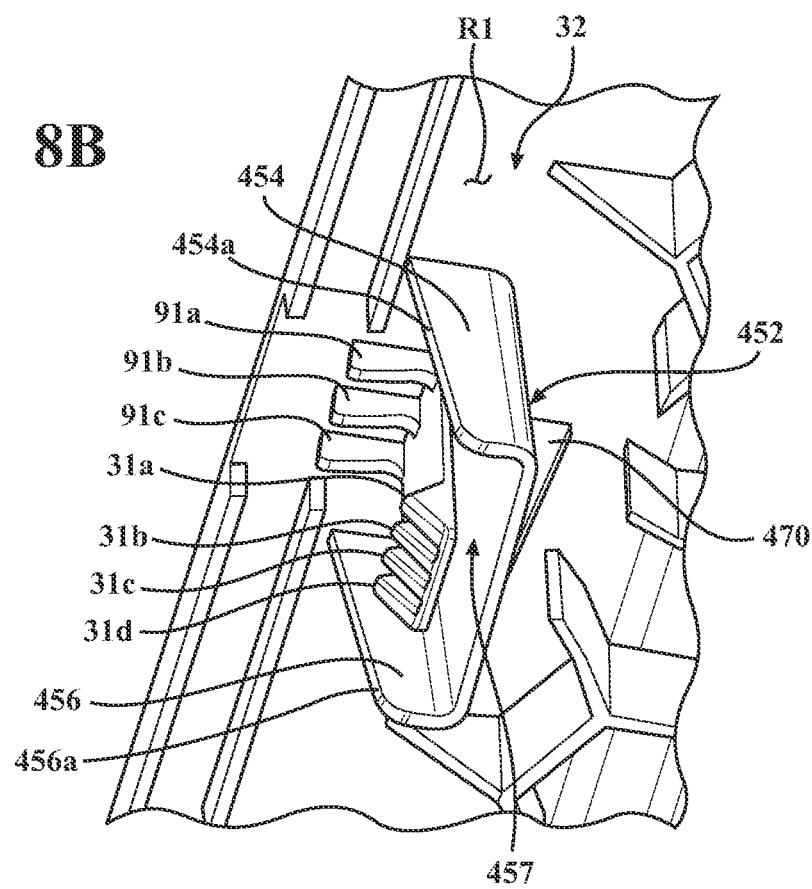
FIG. 8B is a perspective view of the underside of the retention mechanism embodiment shown in FIG. 8A.
Figure 8C:
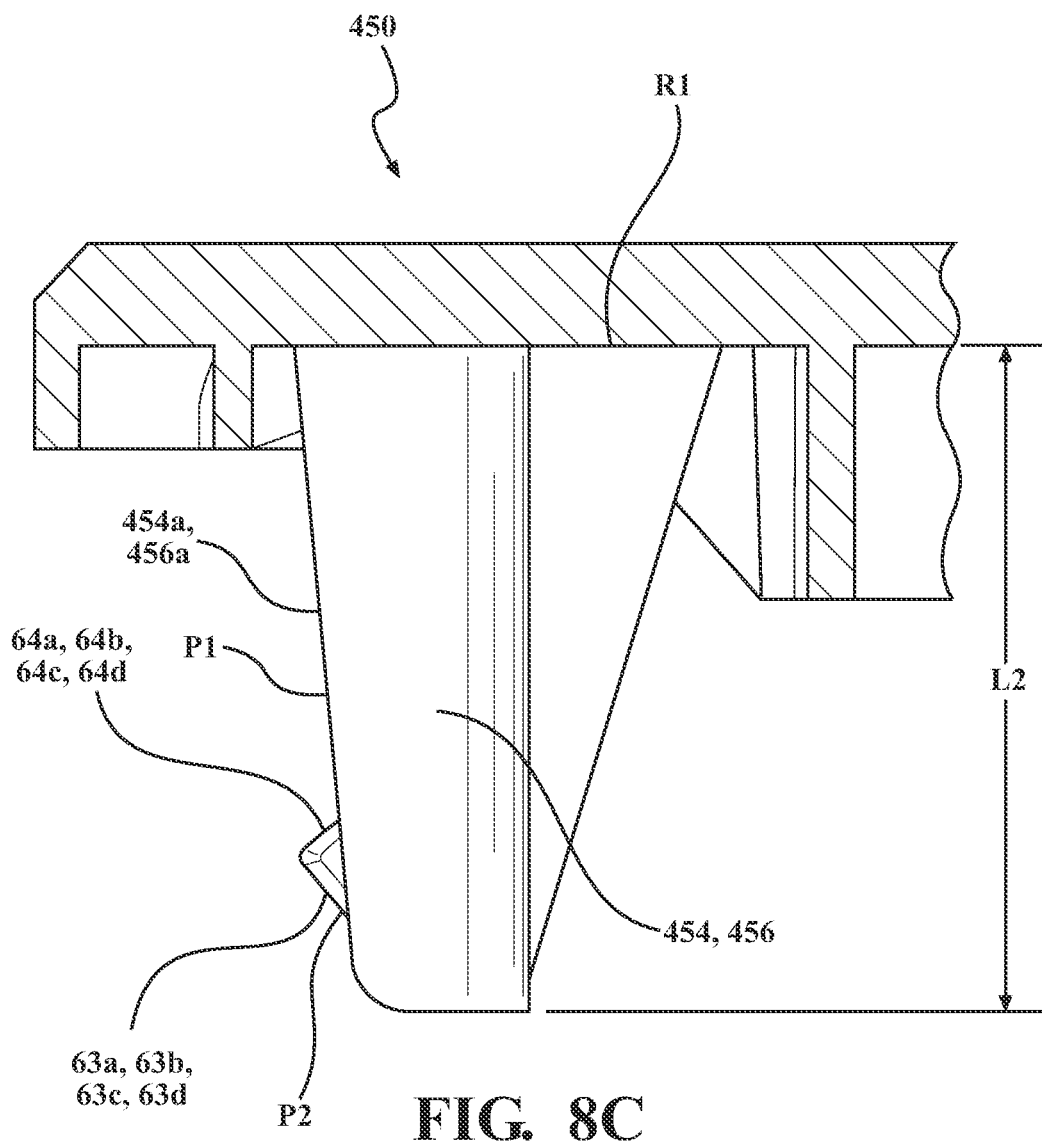
FIG. 8C is a side view of a portion of the retention mechanism embodiment shown in FIGS. 8A-8B.

Referring to FIGS. 8A-8C, in one or more arrangements, another embodiment 450 of the overstress prevention structure may include a first support wall 454 extending from a flat contact wall 452, and a second support wall 456 extending from the contact wall 452 and opposite the first support wall 454. In addition, the contact wall 452, first support wall 454 and second support wall 456 may combine to form a cavity 457 therebetween. In this embodiment, at least a portion of each of engagement heads 31a, 31b, 31c, 31d is structured to reside within the cavity 457 so that the engagement heads are protected by the walls 452, 454, 456 against impact and potential breakage (for example, if the door 32 is dropped onto a floor surface). In this respect, the combination of walls 452, 454, 456 may form a protective "shroud" around the retention tab.

In particular arrangements, at least a portion of at least one of engagement heads 31a, 31b, 31c, 31d is also structured to reside outside the cavity 457 when stem 40 is an undeflected condition. This feature enables the retention tab 60 to be deflected by contact with the panel 36 while the engagement heads are recessed within the cavity 457 and the panel surface contacting the engagement heads resides outside the cavity. In certain arrangements, contact with the panel surface may deflect the engagement heads to a point where they reside completely within the cavity 457. A support wall 470 may extend from contact wall 452 so as to form 90° angles with the contact wall.

Referring to FIGS. 4A and 8A-8C, in particular embodiments, edge 454a of first support wall 454 and edge 456a of second support wall 456 may extend non-orthogonally from reference surface R1 so as to provide tapered lead-in surfaces with respect to edges of panel opening 34. Edges 454a and 456a may also be coplanar. Also, as seen in FIG. 8C, a plane P1 extending along the lead-in edges 454a and 456a may intersect a plane P2 extending along engagement head lead-in surfaces 63a-63d so that an edge feature of panel opening 34 (such as surface 99) sliding along lead-in edges 454a and 456a in a direction toward reference surface R1 during mounting of the door will contact and smoothly engage the engagement head lead-in surfaces 63a-63d, after which the tab 60 may be deflected during door mounting as previously described.

In one or more arrangements, one or more of the support walls may extend in a direction away from the engagement heads 31a, 31b, 31c, 31d. For example, in the embodiments shown in FIGS. 5A-8C, the various support walls extend from their respective contact walls in directions away from the engagement heads 31a, 31b, 31c, 31d residing opposite the support walls.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8C, but the embodiments are not limited to the illustrated structure or application.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A retention mechanism for a removable access door of a vehicle, the retention mechanism comprising:
    a retention tab extending from a side of the access door adjacent an edge of the access door, the retention tab including a resiliently deflectable stem and at least two engagement heads projecting from the stem, the retention tab extending to a first distance from a reference surface of the access door; and
    an overstress prevention structure extending from the side of the access door so as to enable the retention tab to contact the overstress prevention structure when the stem is deflected a predetermined amount during mounting of the access door to a panel of the vehicle, the overstress prevention structure extending to a second distance from the reference surface, wherein the second distance is greater than the first distance.

2. The retention mechanism of claim 1, wherein the overstress prevention structure comprises a contact wall positioned and oriented so as to enable the retention tab to contact the contact wall when the stem is deflected the predetermined amount.

3. The access door retention mechanism of claim 2 wherein the contact wall is curved.

4. The access door retention mechanism of claim 3 wherein the contact wall is cylindrical.

5. The retention mechanism of claim 2 further comprising at least one support wall extending between the contact wall and another portion of the access door.

6. The retention mechanism of claim 5 wherein the at least one support wall is structured to form a 90° included angle with the contact wall.

7. The access door retention mechanism of claim 5 wherein the at least one support wall comprises a first support wall extending from the contact wall, and a second support wall extending from the contact wall and opposite the first support wall so as to form an obtuse included angle between the first support wall and the second support wall.

8. The access door retention mechanism of claim 5 wherein the at least one support wall comprises a first support wall extending from the contact wall, and a second support wall extending from the contact wall and opposite the first support wall, the contact wall, first support wall and second support wall combining to form a cavity therebetween.

9. The access door retention mechanism of claim 8 wherein at least a portion of each engagement head of the at least two engagement heads is structured to reside within the cavity.

10. The access door retention mechanism of claim 8 wherein at least a portion of at least one engagement head of the at least two engagement heads is structured to reside outside the cavity when the stem is in an undeflected condition.

11. The access door retention mechanism of claim 8 wherein an edge of the first support wall and an edge of the second support wall are coplanar and extend non-orthogonally from the reference surface, and wherein a plane extending along the edges of the first support wall and the second support wall intersects a plane extending along lead-in surfaces of the at least two engagement heads.

12. The access door retention mechanism of claim 5 wherein the at least one support wall extends in a direction away from the at least two engagement heads.

* * * * *